United States Patent
Fedok et al.

(10) Patent No.: US 9,361,433 B2
(45) Date of Patent: Jun. 7, 2016

(54) ENTERPRISE LEASING LICENSE ALGORITHM

(75) Inventors: Eric Marshall Fedok, Catasauqua, PA (US); Michael Bellomo, Somerville, NJ (US)

(73) Assignee: Synchronoss Technologies, Inc, Bridgewater, NJ (US)

( * ) Notice: Subject to any disclaimer, the term of this patent is extended or adjusted under 35 U.S.C. 154(b) by 123 days.

(21) Appl. No.: 13/566,870

(22) Filed: Aug. 3, 2012

(65) Prior Publication Data

US 2014/0040475 A1 Feb. 6, 2014

(51) Int. Cl.
*G06F 21/10* (2013.01)
*G06Q 10/10* (2012.01)

(52) U.S. Cl.
CPC .............. *G06F 21/10* (2013.01); *G06F 21/105* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 5,628,005 A | 5/1997 | Hurvig | |
| 5,742,757 A * | 4/1998 | Hamadani | G06F 21/105 705/59 |
| 5,757,920 A | 5/1998 | Misra et al. | |
| 5,771,354 A | 6/1998 | Crawford | |
| 5,923,756 A | 7/1999 | Shambroom | |
| 5,941,944 A | 8/1999 | Messerly | |
| 6,023,620 A | 2/2000 | Harisson | |
| 6,063,134 A | 5/2000 | Peters et al. | |
| 6,163,844 A | 12/2000 | Duncan et al. | |
| 6,535,743 B1 | 3/2003 | Kennedy et al. | |
| 6,539,494 B1 | 3/2003 | Abramson et al. | |
| 6,542,933 B1 | 4/2003 | Durst, Jr. et al. | |
| 6,546,425 B1 | 4/2003 | Hanson et al. | |
| 6,549,933 B1 | 4/2003 | Barrett et al. | |
| 6,553,375 B1 | 4/2003 | Huang et al. | |
| 6,584,454 B1 | 6/2003 | Hummel et al. | |
| 6,654,746 B1 | 11/2003 | Wong et al. | |
| 6,904,449 B1 | 6/2005 | Quinones | |
| 6,915,278 B1 * | 7/2005 | Ferrante | G06F 21/105 380/201 |
| 6,959,331 B1 | 10/2005 | Traversat et al. | |
| 7,159,036 B2 | 1/2007 | Hinchliffe et al. | |
| 7,925,550 B2 * | 4/2011 | Kataria et al. | 705/28 |
| 8,010,095 B2 | 8/2011 | Natsuno et al. | |
| 8,224,308 B1 | 7/2012 | Gavrylyako et al. | |

(Continued)

FOREIGN PATENT DOCUMENTS

| | | |
|---|---|---|
| CN | 1202662 | 12/1998 |
| CN | 1455522 | 11/2003 |

(Continued)

*Primary Examiner* — Ninos Donabed
(74) *Attorney, Agent, or Firm* — Synchronoss Technologies, Inc; Frederick W. Dour

(57) ABSTRACT

Embodiments of the present invention are directed toward an improved enterprise leasing license algorithm and system thereof. A licensing algorithm for enterprise software configured to support expiring floating licenses obtained from a central license server. Floating licenses that have a user limit but not necessarily an expiration date, are installed to a central license server. A license is assigned to a user upon starting of the software program if a valid license has not yet been assigned. On exiting the software program, the user can return the license, making it immediately available to another user, or can keep the license for later use. A user is able to obtain a license while coupled to a network but is able to advantageously continue using the software program while disconnected from the network.

19 Claims, 3 Drawing Sheets

(56) References Cited

U.S. PATENT DOCUMENTS

| | | |
|---|---|---|
| 8,356,280 B2 * | 1/2013 | Becker et al. ............... 717/120 |
| 8,453,152 B2 * | 5/2013 | Druyan et al. ............... 718/103 |
| 2001/0011253 A1 * | 8/2001 | Coley et al. .................... 705/59 |
| 2002/0029347 A1 * | 3/2002 | Edelman ....................... 713/193 |
| 2005/0289072 A1 * | 12/2005 | Sabharwal ............ G06F 21/121 705/59 |
| 2006/0136343 A1 * | 6/2006 | Coley ..................... G06F 21/10 705/59 |
| 2006/0199599 A1 | 9/2006 | Gupta et al. |
| 2007/0005505 A1 * | 1/2007 | D'Alo et al. .................... 705/59 |
| 2007/0143749 A1 * | 6/2007 | Date et al. ..................... 717/172 |
| 2008/0051071 A1 | 2/2008 | Vishwanathan et al. |
| 2008/0234047 A1 * | 9/2008 | Nguyen ................. G07F 17/32 463/42 |
| 2008/0313264 A1 * | 12/2008 | Pestoni ......................... 709/202 |
| 2009/0119218 A1 * | 5/2009 | Ooki .............................. 705/59 |
| 2009/0327305 A1 | 12/2009 | Roberts et al. |
| 2010/0057674 A1 * | 3/2010 | O'Donnell ....................... 707/3 |
| 2012/0059876 A1 * | 3/2012 | Chinta et al. ................. 709/203 |
| 2012/0059917 A1 * | 3/2012 | Dawson et al. .............. 709/223 |
| 2012/0198462 A1 * | 8/2012 | Cham et al. .................. 718/103 |

FOREIGN PATENT DOCUMENTS

| | | |
|---|---|---|
| CN | 1313697 | 2/2005 |
| EP | 0801487 | 10/1997 |
| EP | 0836131 | 4/1998 |
| EP | 0836301 | 4/1998 |
| EP | 0924917 | 6/1999 |
| EP | 0930593 | 7/1999 |
| EP | 1024441 | 2/2000 |
| EP | 0986225 | 3/2000 |
| EP | 1139608 | 10/2001 |
| EP | 1180890 | 2/2002 |
| EP | 1263244 | 12/2002 |
| EP | 2043012 | 1/2009 |
| FR | 1202662 | 12/1998 |
| GB | 2366050 | 6/2001 |
| JP | 7303146 | 11/1995 |
| JP | 10191453 | 7/1998 |
| JP | 11242620 | 9/1999 |
| JP | 11242677 | 9/1999 |
| JP | 2000232680 | 8/2000 |
| JP | 2000316053 | 11/2000 |
| JP | 2002142254 | 5/2002 |
| JP | 2002185575 | 6/2002 |
| JP | 2002247144 | 8/2002 |
| JP | 2002314689 | 10/2002 |
| JP | 2003259011 | 9/2003 |
| WO | 0217140 | 2/2002 |
| WO | 03056789 | 7/2003 |
| WO | 03083716 | 10/2003 |
| WO | 2005112586 | 12/2005 |

* cited by examiner

ENTERPRISE LEASING LICENSE ALGORITHM

FIELD OF THE INVENTION

The present invention relates to an improved enterprise leasing license algorithm and system thereof.

BACKGROUND OF THE INVENTION

Currently, software licenses come in two varieties: license by user and floating license. Under the first variety, licenses are tied to single users. As such, acquiring licenses for all users in an organization can be very costly. Under the alternative variety, floating licenses allow software sharing amongst multiple users, allowing for fewer licenses to be acquired. Floating licenses are useful, such as, for an organization with multiple users when the software is not used by everyone at the same time. A floating license, however, is required for each concurrent user. Cost is thus minimized because the organization need only acquire a sufficient number of licenses for the anticipated number of users who will run the software at the same time. For example, with one floating license, any number of users can access the software, but only one can use it at a time while the others must wait. With n floating licenses, any number of users can access the software but only n can use it at a time while others must wait. Only when a floating license becomes available can another user begin using the software.

All machines that are able to run the software must have network access to a license server. When a user wishes to use or run the software, the user must have a license by requesting one from the license server. Only when there is an available or open license can the user start the software after the license server assigns the user a license. However, once the user disconnects from the license server or exits the software, the license is released automatically to be reclaimed by the license server, allowing another user to start using the software with that license.

Although floating licenses allow the entire organization to use the software, albeit not all at the same time, those that use the software must be connected to the license server during the entire duration of software execution and must make sure that the software is not closed either accidentally (e.g., due to power failure) or intentionally. However, there are times when a user must use the software over a period of time when keeping the software running for that period of time is impractical or inconvenient, or when the user machine is not in a networked environment and/or has lost network connectivity.

SUMMARY OF THE INVENTION

Embodiments of the present invention are directed toward an improved enterprise leasing license algorithm and system thereof. A licensing algorithm for enterprise software is configured to support expiring floating licenses obtained from a central license server. Floating licenses that have a user limit but not necessarily an expiration date, are installed to a central license server. A license is assigned to a user upon starting of the software program if a valid license has not yet been assigned. On exiting the software program, the user can return the license, making it immediately available to another user, or can keep the license for later use. A user is able to obtain a license while coupled to a network but is able to advantageously continue using the software program while disconnected from the network.

In one aspect, a non-transitory computer-readable medium stores instructions that, when executed by a computing device, such as a license server, cause the computing device to perform a method. The computing device is configured to determine whether at least one floating licenses for a software program is available. Assuming that a floating license is available, the computing device is configured to obtain and record client information from a client device that is communicatively coupled with the computing device. In some embodiments, the client information includes a unique identifier of a user, a unique identifier of the client device, or both. In some embodiments, the computing device also records pertinent information regarding the assignment of the floating license to the client device. Pertinent information can include a date/time stamp of the assignment, an expiration date of the assignment, or both.

The computing device is configured to assign the client device a floating license, which has now been indicated as unavailable, and allow the client device to run the software program on the client device regardless of the client device thereafter being communicatively coupled with the computing device until the floating license is reclaimed by the computing device. In some embodiments, the floating license is reclaimed upon expiration of the assignment. In some embodiments, the floating license is reclaimed upon release of the floating licence.

In some embodiments, the computing device is configured to, prior to the assignment expiring, renew the floating license with a new expiration date of the assignment. In some embodiments, the computing device is configured to determine whether a floating license has already been assigned to the client device. If a floating license is indeed already assigned to the client device, then the computing device will not assign another floating license to the client device.

Assuming that a floating license is unavailable, in some embodiments, the computing device is configured to, upon a floating license becoming available, automatically assigning that floating license to the client device.

In another aspect, a non-transitory computer-readable medium storing instructions that, when executed by a computing device, such as a client device, cause the computing device to perform a method. The computing device is configured to obtain a floating license for a software program from a server, and execute the software program regardless of thereafter being communicatively coupled with the server until the floating license is reclaimed by the server. In some embodiments, the computing device is allowed to continue execution of the software program regardless of being communicatively coupled with the server, after previously exiting the software program. In some embodiments, the computing device is allowed to continue execution of the software program without needing to obtain another floating license from the server. In some embodiments, the client device is configured to prompt options to keep the floating license or to release the floating license after the user exits the software program.

In yet another aspect, a system includes a server and one or more client devices. The server is configured to assign one or more floating licenses for a software program. The server is also configured to reclaim a floating license upon an active release of the floating license by a client device. Alternatively or in addition to, the server is configured to reclaim a floating license upon a passive release of the floating license.

Each client device is configured to receive a floating license while communicatively coupled with the server, and to execute the software program upon receiving the floating license, regardless of thereafter being communicatively coupled with the server until the floating license is reclaimed by the server. Each client device is also configured to continue execution of the software program despite previously exiting the software program, without obtaining another floating license.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the present invention are directed toward an improved enterprise leasing license algorithm and system thereof. A licensing algorithm for enterprise software configured to support expiring floating licenses obtained from a central license server. Floating licenses that have a user limit but not necessarily an expiration date, are installed to a central license server. A license is assigned to a user upon starting of the software program if at least one valid license has not yet been assigned. On exiting the software program, the user can return the license, making it immediately available to another user, or can keep the license for later use. A user is able to obtain a license while coupled to a network but is able to advantageously continue using the software program while disconnected from the network.

Figure 1:
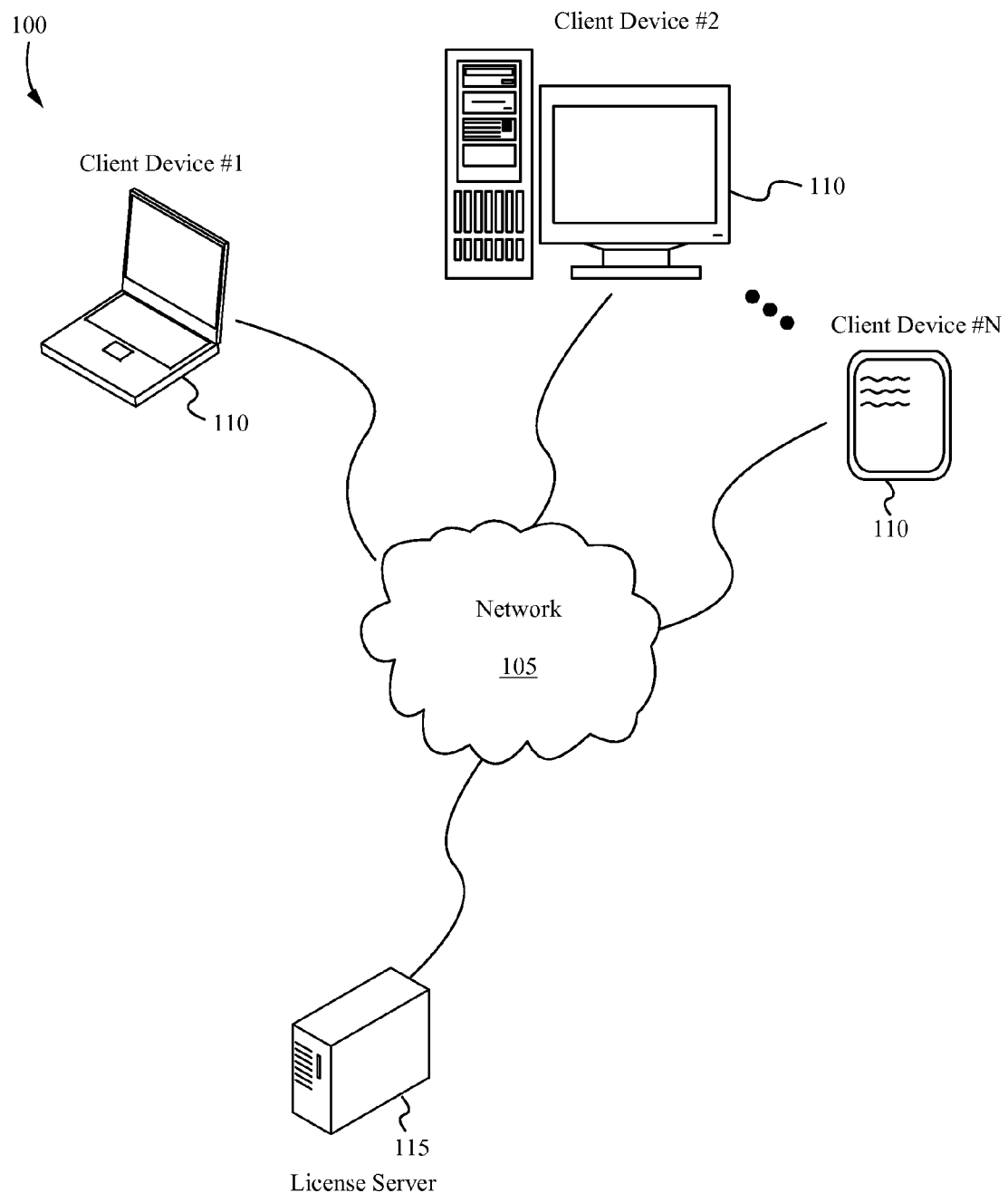
FIG. 1 illustrates an overview of an exemplary system for implementing an embodiment of the present invention.

FIG. 1 illustrates an overview of an exemplary system 100 for implementing an embodiment of the present invention. As shown in FIG. 1, the system 100 includes at least one client device 110. A client device 110 can be a laptop computer, a desktop computer, a personal computer, a mobile device, a tablet or any suitable network-enabled device. A client device 110 is communicatively coupled with a network 105, and is configured to receive and/or send data from/to a server 115, such as a license server, via the network 105. The server 115 is configured to assign an available or open floating license for a software program to a requesting client device 110. It will be understood that the network 105 can be a LAN network, a WLAN network, a WAN network, a MAN network, an Internet network, a cellular network maintained by a cellular carrier, such as a GSM or CDMA network, and/or some other wired or wireless communications link. A user is able to use the client device 110 to run or execute the software program after receiving a floating license from the license server 115. As discussed elsewhere, the floating license advantageously allows the user to use the software program while no longer having access to the server 115 and/or to continue use of the software program after previously exiting the software program, without needing to obtain another floating license from the server 115. The user is able to use the software program until the floating license is eventually reclaimed by or surrendered to the server 115. The server 115 is configured to reclaim the floating license upon either an active or a passive release of the floating license.

Figure 2:
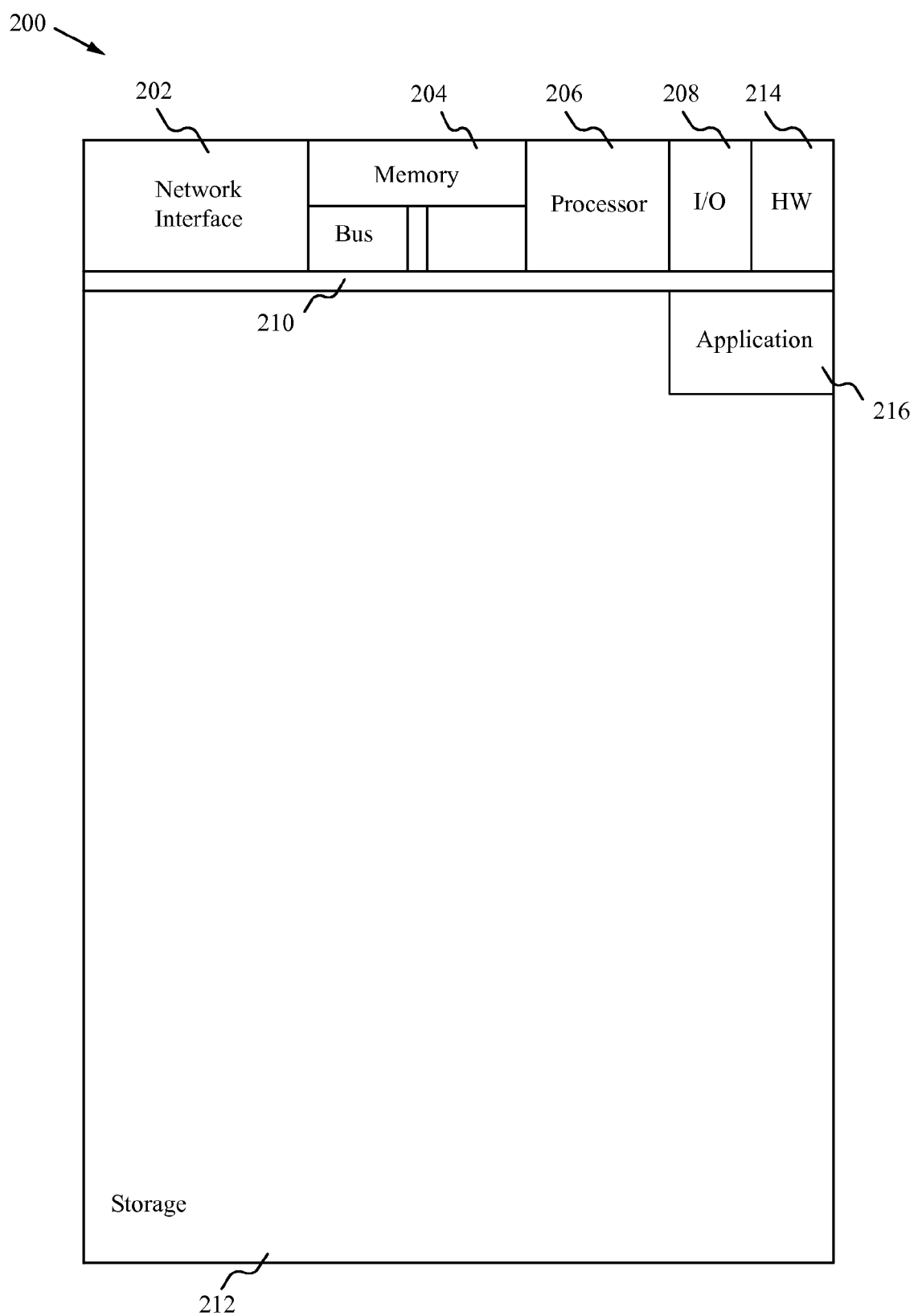
FIG. 2 illustrates a block diagram of an exemplary computing device configured to implement an enterprise leasing license algorithm, in accordance with the present invention.

FIG. 2 illustrates a block diagram of an exemplary computing device 200 configured to implement an enterprise leasing license algorithm, in accordance with the present invention. The computing device 200 is able to be used to acquire, cache, store, compute, search, transfer, communicate and/or display information. For example, the computing device 200 is a client device configured to request and obtain a floating license and to run/execute a software program after a floating license is obtained. In another example, the computing device 200 is license server configured to manage and assign floating licenses.

In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, flash memory card, RAM, ROM, EPROM, EEPROM or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. Application(s) 216 to perform the enterprise leasing license algorithm are likely to be stored in the storage device 212 and memory 204 and are processed by the processor 206. More or less components shown in FIG. 2 are able to be included in the computing device 200. In some embodiments, hardware 220 for performing the enterprise leasing license agreement is included. Although the computing device 200 in FIG. 2 includes applications 216 and hardware 214 for the enterprise leasing license algorithm, the enterprise leasing license algorithm is able to be implemented on a computing device in hardware, firmware, software or any combination thereof.

Consider a license server, such as the server 115 of FIG. 1, that is hosting one or more floating licenses of a software program and has received a floating license request from a user. The license server is typically configured to manage and assign the floating licenses over a network, such as the Internet.

Figure 3:
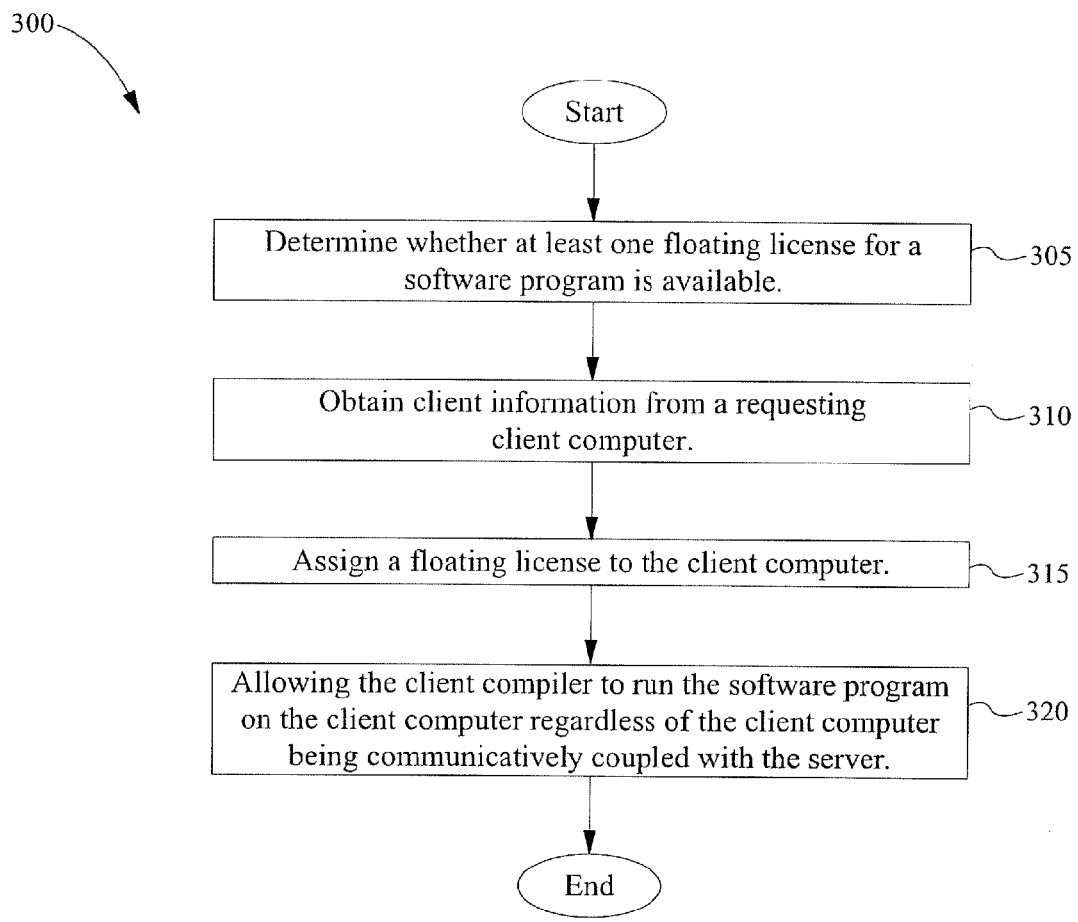
FIG. 3 illustrates an exemplary method of managing and assigning floating licenses, in accordance with the present invention.

FIG. 3 illustrates an exemplary method 300 of managing and assigning floating licenses, in accordance with the present invention. The method 300 begins at a step 305, where the license server determines whether at least one floating license for the software program is available or open. If no floating licenses are available, the license server informs the user that none are available. In some embodiments, the license server is able to indicate to the user when a floating license might become available based on obtained or calculated information such as expiration dates. In some embodiments, the license server is able to store unsatisfied requests for a license and to inform the user when a floating license has indeed become available. In some embodiments, the license server is able to obtain any necessary information from the user when no floating licenses are currently available to speed up the assignment process when a floating license does become available.

Assuming a floating license is available, in some embodiments, the license server then determines whether another floating license has already been assigned to the client device. This prevents two licenses for the same program from being assigned to a single client device 110 (FIG. 1). If none have previously been assigned to the client device, then the license server obtains client information from the client device at a step 310. The client information can include a unique identifier of the user, a unique identifier of the client device, or both. The license server typically records the client information and any pertinent information regarding the assignment of the floating license to the client device, and indicates the floating license as unavailable. In some embodiments, the pertinent information includes a date/time stamp of the assignment. Alternatively or in addition to, the pertinent information includes an expiration date of the assignment. The expiration date can be x days from the assignment date and can be automatically calculated. Alternatively or in addition to, the expiration date is a check-in date provided by the user. The license server is able to, upon request, provide a list of floating licenses that have been checked out, corresponding assignees (e.g., client information), corresponding date/time stamps of the assignments, corresponding expiration dates, or any combination thereof.

At a step 315, the license server assigns the floating license to the client device and indicates or marks the floating license as unavailable. In some embodiments, the step 315 is performed prior to or concurrently with the step 310. The license server thereafter automatically informs the user that the floating license has now been assigned to the user. The floating license is typically encrypted prior to the assignment. In some embodiments, the encryption process is unique and is based on the relationship between the user client and the license server to prevent or discourage tampering with the checked out floating license.

In some embodiments, if at the step 305, the license server determines that no floating licenses are available, the license server will automatically perform the step 315 upon a floating license becoming available, without the user re-requesting a floating license. In some embodiments, the license server will also automatically perform the step 310 if the client information had not been previously requested and saved by the license server.

After the floating license is assigned to the client device, at a step 320, the client device is able to run the software program on the client device regardless of the client device thereafter being communicatively coupled with the license server. In other words, the client device can be communicatively de-coupled, either intentionally or accidentally, from the license server while running or executing the software program. Furthermore, the user is also able to resume execution of the software program after previously exiting the software program, either intentionally or accidentally, and without needing to obtain another floating license from the license server. After the step 320, the method 300 ends.

Typically, the user is able to run the software program on the client device until the floating license is reclaimed by the license server. The license server reclaims a floating license when the floating license is either actively or passively released. In some embodiments, the user is able to use the software program until the user actively releases the floating license. The floating license does not necessarily have an expiration date. The user is able exit and start the software program numerous times until the user no longer needs the software program. At this time, the user actively releases the floating license. Typically, when a user actively releases a floating license, the client device is communicatively coupled with the license server. If the client device is communicatively de-coupled from the license server, the floating license can still be actively released by, for example, the user performing a client side release of the floating license and informing an administrator to actively release the floating license in the license server. The license server is thereafter able to reassign the floating license to another user.

In some embodiments, the user is able to use the software program for a predetermined length of time (e.g., up until the expiration date). The predetermined length of time can be set by an administrator or indicated by the user prior to the assignment of the floating license to the user. After the assignment of the floating license expires, the floating license is passively released and the user will no longer use the software program. Typically, an encrypted key that is needed for using the software program becomes invalid or useless. However, other procedures for enforcing expiration on the client device are also contemplated. The license server is thereafter able to reassign the floating license to another user.

In some embodiments, prior to the assignment expiring, the user is able to renew the floating license. The assignment will thus be associated with a new expiration date. In some embodiments, when the user is renewing the floating license, the client device is communicatively coupled with the license server. If the client device is communicatively de-coupled from the license server, the floating license can still be renewed by, for example, the user informing an administrator who renews the floating license for the user.

Figure 4:
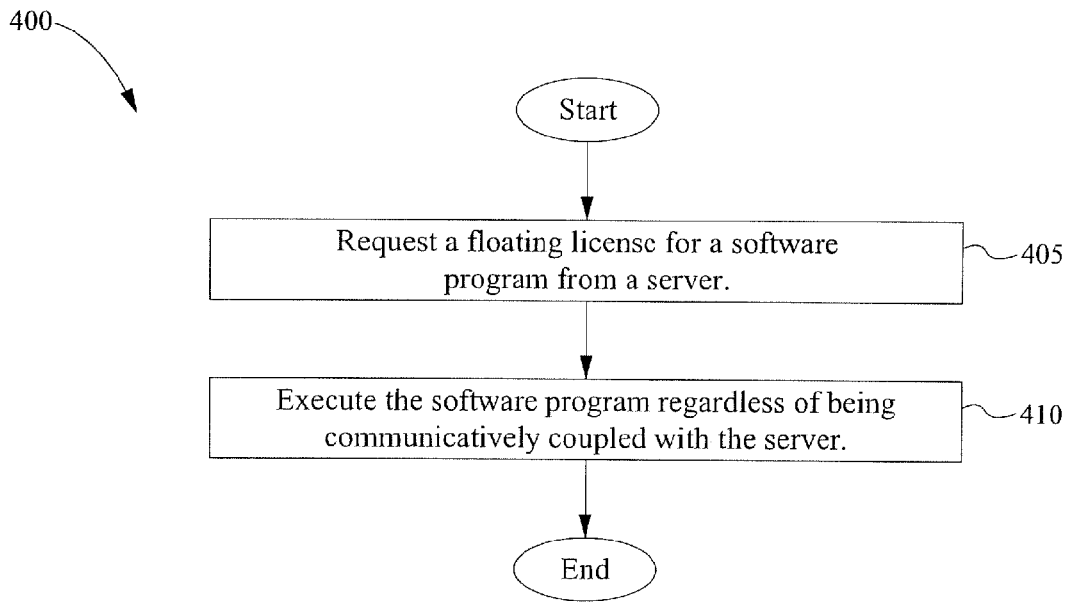
FIG. 4 illustrates an exemplary method of using a software program, in accordance with the present invention.

FIG. 4 illustrates an exemplary method 400 of using the software program, in accordance with the present invention. The method 400 begins at a step 405, where the client device obtains a floating license for the software program from the license server. Typically, the client device is communicatively coupled with the license server. FIG. 3 and its respective discussion describe an exemplary method of managing and assigning floating licenses performed by the license server. However, other methods of managing and assigning floating licenses performed by the license server are possible. At a step 410, the client device is able to execute the software program regardless of being communicatively coupled with the license server until the floating license is reclaimed by the license server. After the step 410, the method 400 ends.

In some embodiments, the user is prompted with options to keep the floating license or to release the floating license after exiting the software program. If the user elects to keep the floating license, then the user is able to continue execution of the software program at a later time. Put differently, when the user restarts the software program after previously exiting it, the user is able to use the software program without needing to obtain another floating license from the license server. If the user elects to release the floating license, then the floating license will be reclaimed by the license server to be made available for another user.

In some embodiments, the license server reclaims the floating license when the floating license is released upon expiration of the assignment. As discussed above, in some embodiments, prior to the assignment expiring, the user is able to renew the floating license.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer-readable medium storing instructions that, when executed by a computing device, cause the computing device to perform a method comprising:
   determining whether any of a plurality of floating licenses for a software program is available;
   determining whether a requesting client device is already assigned one of the plurality of floating licenses for the software program; and
   based on a determination that the client device is not yet assigned a floating license for the software program,
      obtaining client information from the client device that is communicatively coupled with the computing device even when all of the plurality of floating licenses for the software program have already been assigned to other client devices;
      based on a determination that at least one of the plurality of floating licenses for the software program is available, assigning an available floating license to the client device, wherein the floating license is encrypted based on a relationship between the computing device and the client device;
      establishing a check-in date provided by the client device as an expiration date for the floating license; and
      allowing the client device to run the software program on the client device regardless of the client device thereafter being communicatively coupled with the computing device until the floating license assigned to the client device is reclaimed by the computing device.

2. The non-transitory computer-readable medium of claim 1, wherein the computing device is a license server.

3. The non-transitory computer-readable medium of claim 1, wherein the client information includes at least one of a unique identifier of a user and a unique identifier of the client device.

4. The non-transitory computer-readable medium of claim 1, wherein the method further comprises recording the client information.

5. The non-transitory computer-readable medium of claim 1, wherein the method further comprises recording pertinent information regarding the assignment of the floating license to the client device.

6. The non-transitory computer-readable medium of claim 5, wherein the pertinent information includes a date/time stamp of the assignment.

7. The non-transitory computer-readable medium of claim 5, wherein the pertinent information includes an expiration date of the assignment.

8. The non-transitory computer-readable medium of claim 7, wherein the method further comprises prior to the assignment expiring, renewing the floating license with a new expiration date of the assignment.

9. The non-transitory computer-readable medium of claim 1, wherein the method further comprises reclaiming the floating license upon expiration of the assignment.

10. The non-transitory computer-readable medium of claim 1, wherein the method further comprises reclaiming the floating license upon release of the floating license.

11. The non-transitory computer-readable medium of claim 1, wherein the method further comprises indicating the floating license as unavailable.

12. The non-transitory computer-readable medium of claim 1, wherein the method further comprises, upon a floating license becoming available, automatically assigning that floating license to the client device.

13. A non-transitory computer-readable medium storing instructions that, when executed by a computing device, cause the computing device to perform a method comprising:
   sending to a server client information even when all floating licenses for a software program are already assigned to other client devices;
   receiving from the server an indication when one of the floating licenses for a software program will become available;
   obtaining the floating license for the software program from the server when the floating license becomes available, wherein the floating license obtained from the server is encrypted based on a relationship between the server and the computing device;
   providing a check-in date as an expiration date for the floating license;
   executing the software program regardless of thereafter being communicatively coupled with the server until the floating license is reclaimed by the server; and
   prompting an option to keep the floating license and an option to release the floating license after exiting the software program.

14. The non-transitory computer-readable medium of claim 13, wherein the method further comprises allowing continued execution of the software program regardless of being communicatively coupled with the server after previously exiting the software program.

15. The non-transitory computer-readable medium of claim 13, wherein the method further comprises allowing continued execution of the software program without needing to obtain anot, her floating license from the server.

16. A system comprising:
   a. a server including a non-transitory computer-readable medium storing instructions that, when executed by the server, causes the server to assign one or more floating licenses for a software program after encrypting, by the server, the one or more floating licenses, wherein the server stores unsatisfied license requests and informs a requester of one of the unsatisfied requests when a floating license becomes available; and
   b. one or more client devices, each of the one or more client devices configured to:
   1. receive a floating license while communicatively coupled with the server, wherein the floating license received by the each of the one or more client devices is encrypted based on a relationship between the server and the each of the one or more client devices;
   2. provide a check-in date as an expiration date for the floating license;
   3. execute the software program upon receiving the floating license, regardless of thereafter being communicatively coupled with the server until the floating license is reclaimed by the server; and
   4. continue execution of the software program despite previously exiting the software program, without obtaining another floating license.

17. The system of claim 16, wherein the server reclaims a floating license upon an active release of the floating license by a client device.

18. The system of claim 16, wherein the server reclaims a floating license upon a passive release of the floating license.

19. The system of claim 16, wherein the server obtains any necessary information from the requesting client device when no floating licenses are currently available.

* * * * *